US009094621B2

(12) United States Patent
Rekiere (10) Patent No.: US 9,094,621 B2
(45) Date of Patent: Jul. 28, 2015

(54) DOCUMENT MANAGEMENT (75) Inventor: Joseph Rekiere, Boise, ID (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 3116 days.

(21) Appl. No.: 11/189,907

(22) Filed: Jul. 25, 2005

(65) Prior Publication Data
US 2007/0019244 A1 Jan. 25, 2007

(51) Int. Cl.
G06F 3/12 (2006.01)
G06K 15/00 (2006.01)
H04N 1/405 (2006.01)
B41C 1/00 (2006.01)
H04L 9/00 (2006.01)
H04N 1/32 (2006.01)
H04N 1/44 (2006.01)

(52) U.S. Cl.
CPC .......... *H04N 1/32144* (2013.01); *H04N 1/4406* (2013.01); *H04N 1/4413* (2013.01); *H04N 2201/324* (2013.01); *H04N 2201/3205* (2013.01); *H04N 2201/3212* (2013.01); *H04N 2201/3235* (2013.01); *H04N 2201/3271* (2013.01); *H04N 2201/3274* (2013.01)

(58) Field of Classification Search
USPC .......... 705/3, 1; 382/100, 305; 358/1.11, 471, 358/1.14, 3.28, 1.18, 302; 713/176, 175
See application file for complete search history.

(56) References Cited

U.S. PATENT DOCUMENTS

| 5,930,471 | A | 7/1999 | Milewski et al. |
| 6,324,569 | B1 | 11/2001 | Ogilvie et al. |
| 6,721,784 | B1 | 4/2004 | Leonard et al. |
| 6,735,324 | B1 * | 5/2004 | McKinley et al. ............ 382/100 |
| 6,757,713 | B1 | 6/2004 | Ogilvie et al. |
| 6,789,194 | B1 | 9/2004 | Lapstun et al. |
| 6,834,169 | B2 * | 12/2004 | Hren et al. ...................... 399/82 |
| 6,912,294 | B2 * | 6/2005 | Wang et al. ................... 382/100 |
| 6,924,904 | B2 * | 8/2005 | Stevens et al. ............... 358/1.18 |
| 6,930,803 | B1 * | 8/2005 | Suzuki .......................... 358/471 |
| 7,047,412 | B2 * | 5/2006 | Echizen et al. ............... 713/176 |
| 7,184,571 | B2 * | 2/2007 | Wang et al. ................... 382/100 |
| 7,249,257 | B2 * | 7/2007 | Brundage et al. ............. 713/176 |
| 7,301,654 | B2 * | 11/2007 | Matsunoshita et al. ...... 358/1.14 |
| 7,346,580 | B2 * | 3/2008 | Lisanke et al. .................. 705/50 |
| 7,756,892 | B2 * | 7/2010 | Levy ............................. 707/781 |
| 2002/0049614 | A1 * | 4/2002 | Rice et al. .......................... 705/3 |
| 2002/0054317 | A1 * | 5/2002 | Matsunoshita et al. ...... 358/1.14 |
| 2002/0126869 | A1 * | 9/2002 | Wang et al. ................... 382/100 |
| 2003/0011799 | A1 * | 1/2003 | Kobziar et al. .............. 358/1.11 |
| 2003/0210805 | A1 * | 11/2003 | Lofgren et al. ............... 382/100 |
| 2004/0049571 | A1 | 3/2004 | Johnson et al. |
| 2004/0073443 | A1 | 4/2004 | Gabrick et al. |

(Continued)

OTHER PUBLICATIONS

Custom Business Applications Corporation, "Small Business Security Manager Version 4.2," <http://www.cbacorp.com/prodsbsm.htm>, Visited: Apr. 14, 2005.

(Continued)

*Primary Examiner* — Akwasi M Sarpong
(74) *Attorney, Agent, or Firm* — Hewlett-Packard Patent Department (57) ABSTRACT

A document management method is disclosed. The method includes generating and merging a unique watermark for and with each page of a print job to be produced. For each watermark, data identifying the watermark is associated with data identifying a document page corresponding to the print job page with which that watermark is merged.

30 Claims, 8 Drawing Sheets

(56) References Cited

U.S. PATENT DOCUMENTS

| | | | |
|---|---|---|---|
| 2004/0153649 A1* | 8/2004 | Rhoads et al. | 713/176 |
| 2004/0215510 A1* | 10/2004 | Wilkie | 705/14 |
| 2004/0230662 A1 | 11/2004 | Estrada et al. | |
| 2005/0063027 A1* | 3/2005 | Durst et al. | 359/2 |
| 2005/0068582 A1* | 3/2005 | Ferlitsch | 358/1.18 |
| 2005/0129270 A1* | 6/2005 | Prakash | 382/100 |
| 2006/0001898 A1* | 1/2006 | Maeshima et al. | 358/1.14 |
| 2006/0098236 A1* | 5/2006 | Yamashita et al. | 358/302 |
| 2006/0209350 A1* | 9/2006 | Tabata | 358/3.28 |
| 2007/0055689 A1* | 3/2007 | Rhoads et al. | 707/102 |
| 2008/0028223 A1* | 1/2008 | Rhoads | 713/176 |

OTHER PUBLICATIONS

Hummingbird Ltd., "Hummingbird RM," <http://www.edge.com/empweb/downloads/hbrd%20rm.pdf>, Visited: Apr. 2003.

Netmation Inc., "Project Management," <http://netmation.com/projman.htm>, Visited: Jun. 4, 2004.

* cited by examiner

| USER 44 | DOCUMENT 46 | PAGE 48 | STATUS 50 |
|---|---|---|---|
| User ID (1) | DOCUMENT ID (1,1) | page ID (1,1,1) | status |
| | | page ID (1,1,2) | status |
| | | *** | *** |
| | | page ID (1,1,n) | status |
| | DOCUMENT ID (1,2) | page ID (1,2,1) | status |
| | | page ID (1,2,2) | status |
| | | *** | *** |
| | | page ID (1,2,n) | status |
| | *** | *** | *** |
| | DOCUMENT ID (1,m) | page ID (1,m,1) | status |
| | | page ID (1,m,2) | status |
| | | *** | *** |
| | | page ID (1,m,n) | status |
| User ID (2) | DOCUMENT ID (2,m) | page ID (2,m,n) | status |
| *** | *** | *** | *** |
| User ID (z) | DOCUMENT ID (z,m) | page ID (z,m,n) | status |

DOCUMENT MANAGEMENT

BACKGROUND

Managing printed documents can be a difficult or at least time consuming and tedious task. With confidential or other sensitive documents, it can be important to track the status at the page level. In other words, when a confidential document is copied, scanned, or destroyed, for example, it can prove beneficial to track such operations with respect to each page of that document.

DETAILED DESCRIPTION

Introduction:

With confidential or other sensitive documents, it can be important to track document status at the page level. For example, when a confidential document is copied, scanned, or destroyed, it can prove beneficial to track such operations with respect to each page of that document. Various embodiments operate to manage printed documents at the page level. Discussed in detail below, each page of a document can be printed with a unique watermark used to associate that document page with its status. When a page is copied, the watermark can be identified and associated with data indicating that the document page has been copied. The copy can also include a unique watermark associating the copied document page with a particular person responsible for the copy. Before a document page (copy or original) is destroyed, its watermark can be recognized and associated with data indicating its destruction.

The following description is broken into sections. The first section, labeled "environment" describes an exemplary computing environment in which embodiments may be implemented. The second section, labeled "components," describes exemplary logical and physical components used to implement various embodiments. The third section, labeled "operation," describes exemplary method steps for implementing various embodiments.

Figure 1:
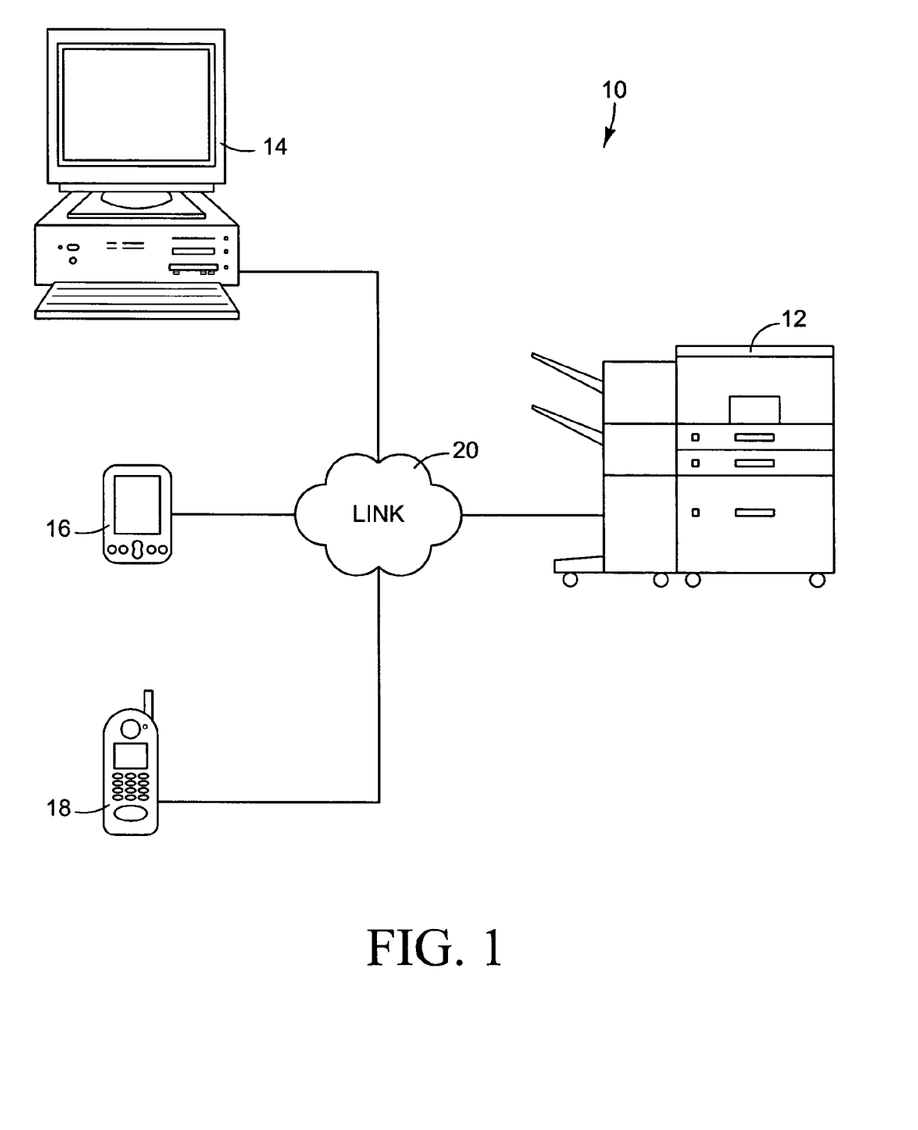
FIG. 1 is a schematic view of an exemplary network in which embodiments of the present invention may be implemented.

Environment:

Although the various embodiments of the invention disclosed herein will be described with reference to the computer network 10 shown schematically in FIG. 1, the invention is not limited to use with network 10. The invention may be implemented in any environment in which printed documents may be managed. Referring to FIG. 1, network 10 represents generally any local or wide area network such as the Internet in which a variety of different electronic devices are linked. Network 10 includes server imaging device 12 and client devices 14-18. Client devices 14-18 represent generally any computing devices capable of instructing imaging device to produce a print job. Imaging device 12 represents generally any device capable of printing a document. A printed document may be an original document produced according to a print job received from one of client devices 14-18, a copy generated from an original document, or a facsimile message received by an imaging device from a remote source.

Communication link 20 interconnects imaging device 12 with client devices 14-18. Communication link 20 represents generally one or more of a cable, wireless, fiber optic, or remote connection via a telecommunication link, an infrared link, a radio frequency link, or any other connector or system that provides electronic communication between devices 12 and 14. Communication link 20 may represent an intranet, the Internet, or a combination of both. The paths followed by link 20, between devices 12 and 14 in the schematic view of FIG. 1, represent the logical communication paths between these devices, not necessarily the physical paths between the devices. Devices 12, 14, 16, and 18 can be connected to network 10 at any point and the appropriate communication path established logically between the devices.

Components:

The logical components of various embodiments of the invention will now be described with reference to the exemplary block diagram of FIG. 2. Imaging device 12 is shown to include print engine 22, scan engine 24, communication interface 26, user interface 28, document manager 30, and controller 31. Print engine 22 represents generally any combination of hardware and/or programming capable of forming a printed image on paper or other media. For example, where imaging device 12 is a laser printer, print engine 22 includes all the electro-photographic and paper handling components required to, retrieve a sheet from an input tray, fix toner or ink to the sheet in the form of a desired image, and pass the sheet to an output bin.

Scan engine 24 represents generally any combination of hardware and/or programming capable of digitizing document pages to form an electronic copy of the document. Scan engine 24 is also responsible, when appropriate, for providing the electronic copy to print engine 22 allowing a physical copy to be printed.

Communication interface 26 represents generally any combination of hardware and/or programming capable of serving as a communication interface between imaging device 12 and one or more client devices such as client devices 14-18 in FIG. 1. Communication interface 26, for example, may be a wired or wireless network interface. Alternatively, communication interface may be any of a wide variety of suitable parallel or serial interfaces.

User interface 28 represents any combination of hardware and/or programming capable of serving as a interface between imaging device 12 and a user. For example, user interface 28 may include a touch screen and one or more buttons for commanding the operation of imaging device 12.

Document manager 30, described in more detail below, represents generally any combination of hardware and/or programming capable of page-level management of printed documents. Controller 31 represents generally any combination of hardware and programming for controlling or otherwise guiding the operation and interaction between print engine 22, scan engine 24, communication engine 26, user interface 28, and document manager 30.

Figure 2:
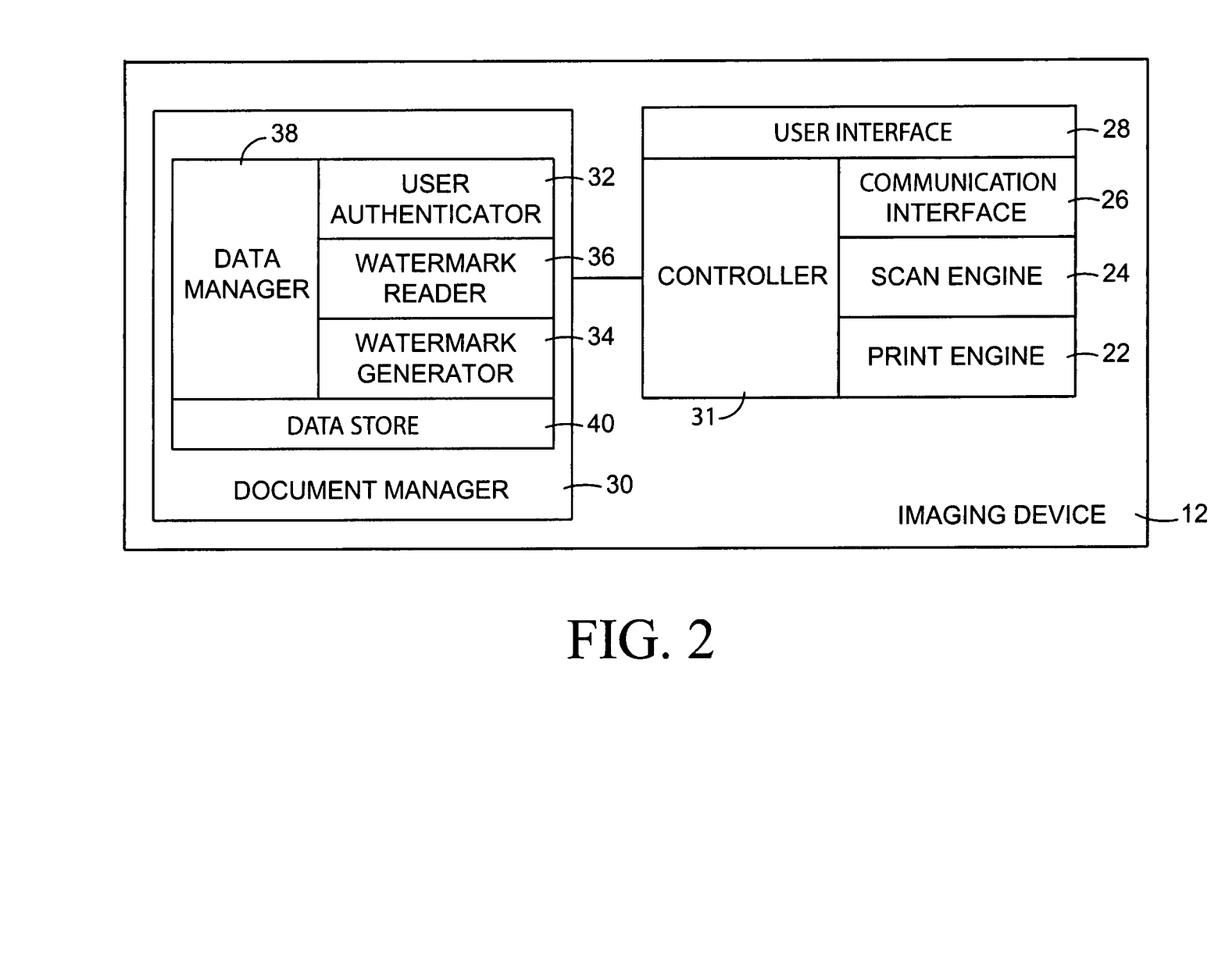
FIG. 2 is a block diagrams illustrating logical and physical components operating on an imaging device according to an embodiment.

As illustrated in FIG. 2, document manager 30 includes user authenticator 32, watermark generator 34, watermark reader 36, data manager 38, and data store 40. User authenticator 32 represents generally any combination of hardware and/or programming capable of identifying a user responsible for a document. A responsible user may, for example, be a user who caused imaging device to print a document. A responsible user may be a person who caused an operation such as scanning, copying, or shredding, to be performed on a document. A user may be identified by examining credentials such as a user name and password or a digital signature or key or by identifying a source of a print job, such as an IP (Internet Protocol) or other network address.

Watermark generator 34 represents generally any combination of hardware and/or programming capable of generating and merging a unique watermark for and with each page of a print job to be produced by print engine 22. A print job to be produced may be a print job received from a client device such as client devices 14-18 of FIG. 1. A print job to be produced may be an electronic copy of a document digitized by scan engine 24. A print job may even be an electronic version of a faxed document received from a remote source.

The term watermark, as used herein, is broadly defined to include any information that can be used to uniquely identify a particular page of a particular document. When the page is printed, the watermark may or may not be visible to the human eye. A visible watermark may include a barcode or other code printed with visible ink. A non visible watermark may include barcode or other code printed in ink not visible to the human eye. For example, some colors of yellow cannot be detected by the human eye but can be detected by an optical scanner. Watermarks, however, are not limited to barcodes. Data can be encoded in printed images and text in any of a number of ways. For example, information can be encoded in "noise" added to an image. Information can be encoded in text by strategically altering the spacing between the letters in one or more words or between adjacent lines of text.

To serve its purpose of uniquely identifying a page of a document, a watermark encodes information such as a document identifier a page number and a random or running sequence. The following is an example—house-plans.page4.AEF223. The portion "house-plans" identifies the document, "page4" identifies the page, and the sequence "AEF223" helps ensure uniqueness distinguishing the watermark encoding the information from other watermarks.

Watermark reader 36 represents generally any combination of hardware and/or programming capable of recognizing information encoded in a watermark. In doing so, watermark reader 36 may utilize an electronic copy of a document page digitized by scan engine 24. Scan engine 24 may also include a barcode reader or other mechanism that directly scans water marks such as barcodes instead of digitizing a document page. Data manager 38 represents generally any combination of hardware and/or programming capable of electronically associating a watermark with the document page it is meant to identify. Data manager 38 may also associate watermarks with users and status information. Data store 40 represents information created, used, and updated by data manager 38 in the performance of its tasks.

Figure 3:
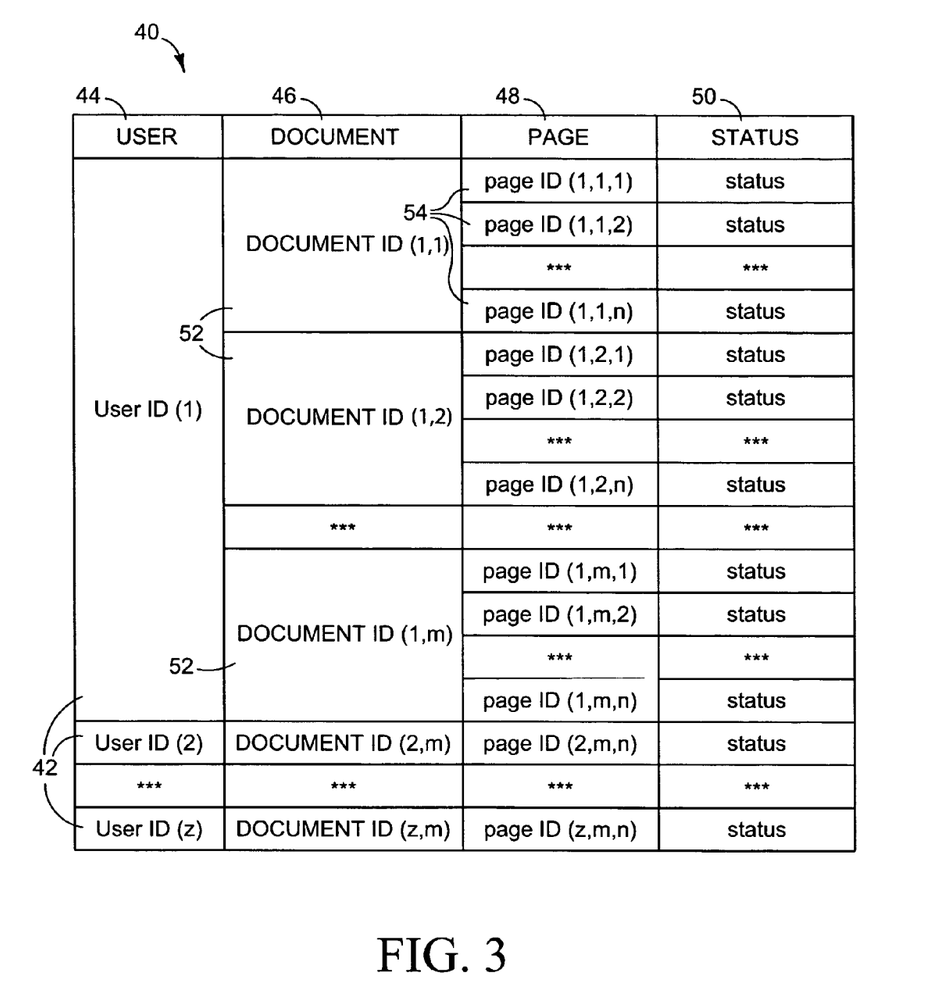
FIG. 3 is a block diagram of a table associating users, documents, document pages, and the status of the document pages according to an embodiment.

FIG. 3 provides an illustration of an exemplary implementation of data store 40. In the example shown, data store 40 is a table containing user entries 42. Each user entry 42 corresponds to a particular user and includes data in fields 44-50. User field 44 for a particular entry 42 contains data identifying a user responsible for a particular document or set of documents. Data identifying a particular user may, but need not, identify a particular individual. Instead, the data could identify a computing device or other source of instructions for producing the document.

Each main entry 42 can include one or more document entries such as document entries 52. Each document entry 52 corresponds to a particular document associated with the responsible user identified by data in user field 44 of user entry 42. Document field 46 for a particular document entry 52 contains data identifying a particular document.

Each document entry 52 can include one or more page entries 54. Each page entry 54 corresponds to a particular page of a document identified by data in document field 46 of a document entry 52. Each page entry 54 contains data in a page field and in a status field. Data in page field 48 for a particular page entry 54 contains data identifying a particular page of that document. The data identifying a page may, for example, include data encoded by a watermark printed on that page. Data in status field 50 for a particular page entry 54 may include data for use in managing that page. For example data in status field 50 of a particular page entry 54 may indicate permissions with respect to the page, whether the page is a copy or an original; whether the page has been copied and by whom, and whether the page has been destroyed and by whom. Permissions for a page may, for example, identify those authorized to transmit, copy, and/or destroy the page.

In this manner a document can be managed at the page level. When an operation such as shredding or copying is performed on a single page of a document, the status of that page can be updated and later tracked. If need be, a user associated with that page can be identified.

Figure 4:
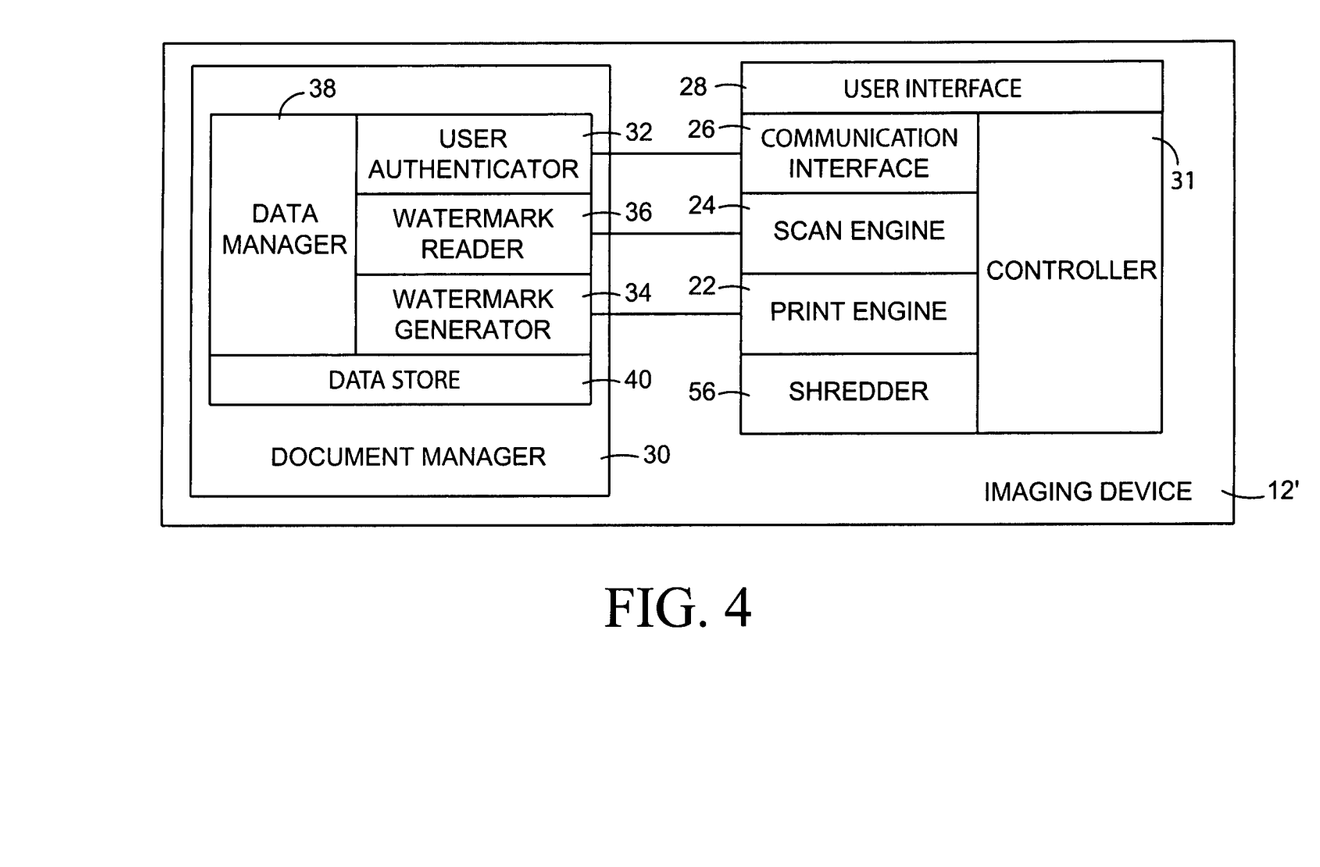
FIG. 4 is a block diagram illustrating logical and physical components operating on an imaging device according to another embodiment.
Figure 5:
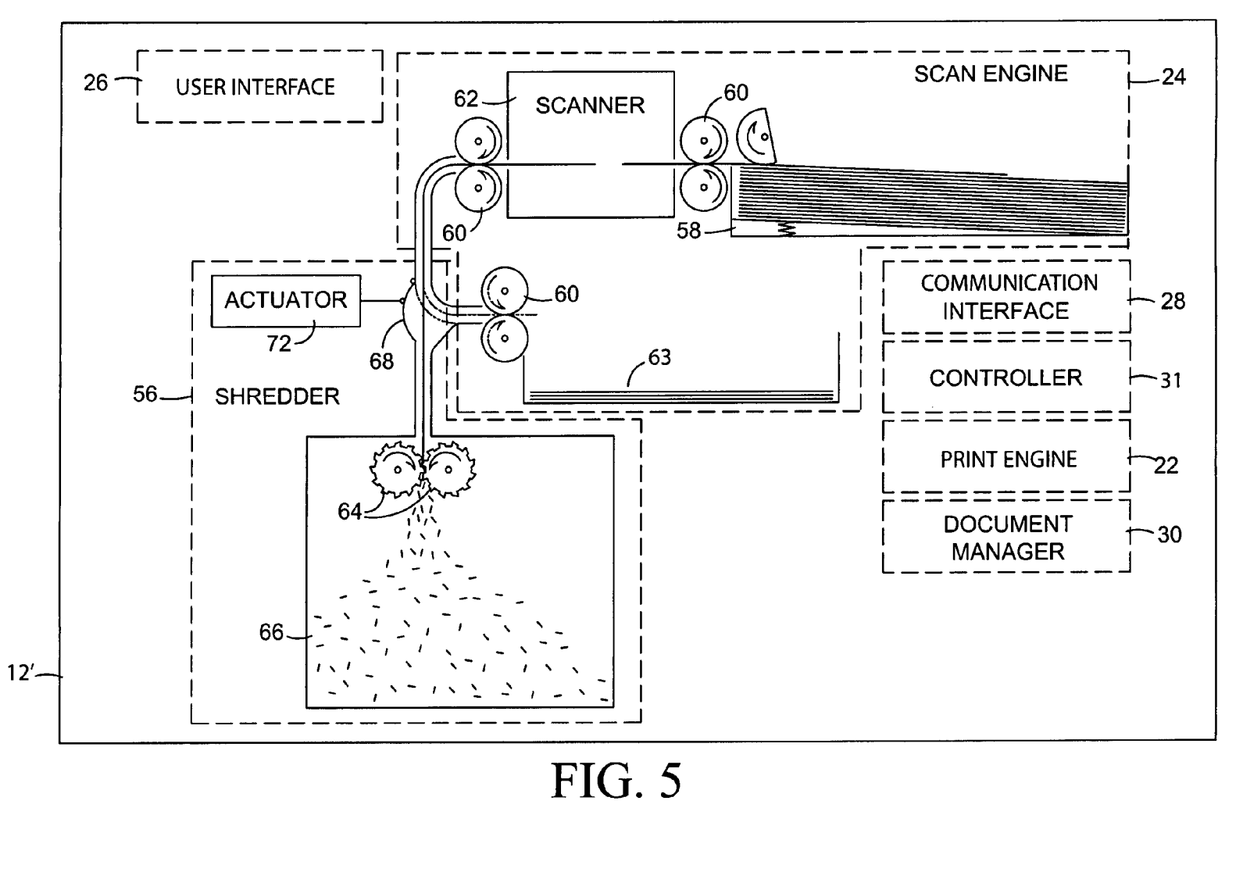
FIG. 5 is an exemplary schematic view of the imaging device of FIG. 4.

Referring now to FIGS. 4 and 5, shredder 56 is integrated into imaging device 12'. Shredder 56 represents generally any combination of hardware capable of shredding or otherwise destroying document pages. FIG. 5 schematically illustrates an exemplary implementation of imaging device 12'. Scan engine 24 is shown to include input tray 58, drive rollers 60, and scanner 62. Under the direction of controller 31, input tray 58 feeds a sheet to drive rollers 60 which urge the sheet past scanner 62. Controller 61 utilizes scanner 62 to digitize the sheet creating an electronic copy. In normal operation drive rollers urge the sheet into output bin 63.

Shredder 56 is shown to include cutters 64, bin 66, diverter 68 and actuator 72. Cutters represent generally any mechanism capable of shredding, cutting, or otherwise destroying printed sheets. Bin 66 represents a receptacle for holding waste remains of sheets shredded by cutters 64.

Diverter 68 is a hinged door that alters a paper path depending on whether it is held in an open or in a closed position. Actuator 72, under the direction of controller 31, opens and closes diverter 68. When diverter 68 is in a closed position, drive rollers 60 urges sheets from input bin 58 into the output bin 63. When diverter 68 is held in an open position, drive rollers 60 urge media sheets into shredder 56.

In operation, a user through user interface 26 instructs that a page is to be shredded. The page is placed in input bin 24. Drive rollers 60 urge the page past scanner 62 which digitizes or otherwise decodes at least a portion of the page that contains a watermark. Document manager 30 recognizes the watermark from the digitized copy and, referring back to FIG. 3, locates a page entry 54 containing data in page field 48 corresponding to information encoded in the watermark. Document manager 40 may access data in status field 50 of that page entry 54 to determine if the user is authorized to destroy the page.

If authorized or if authorization is not needed, document manager 30 then updates data in the status field 50 of that page entry 54 to indicate that the page has been or will be destroyed. Actuator 72 moves diverter into the open position, and drive rollers 60 urge the page into shredder 56 causing the page to be destroyed. If the user is not authorized, diverter 68 remains closed and the page is urged into output bin 63.

Figure 6:
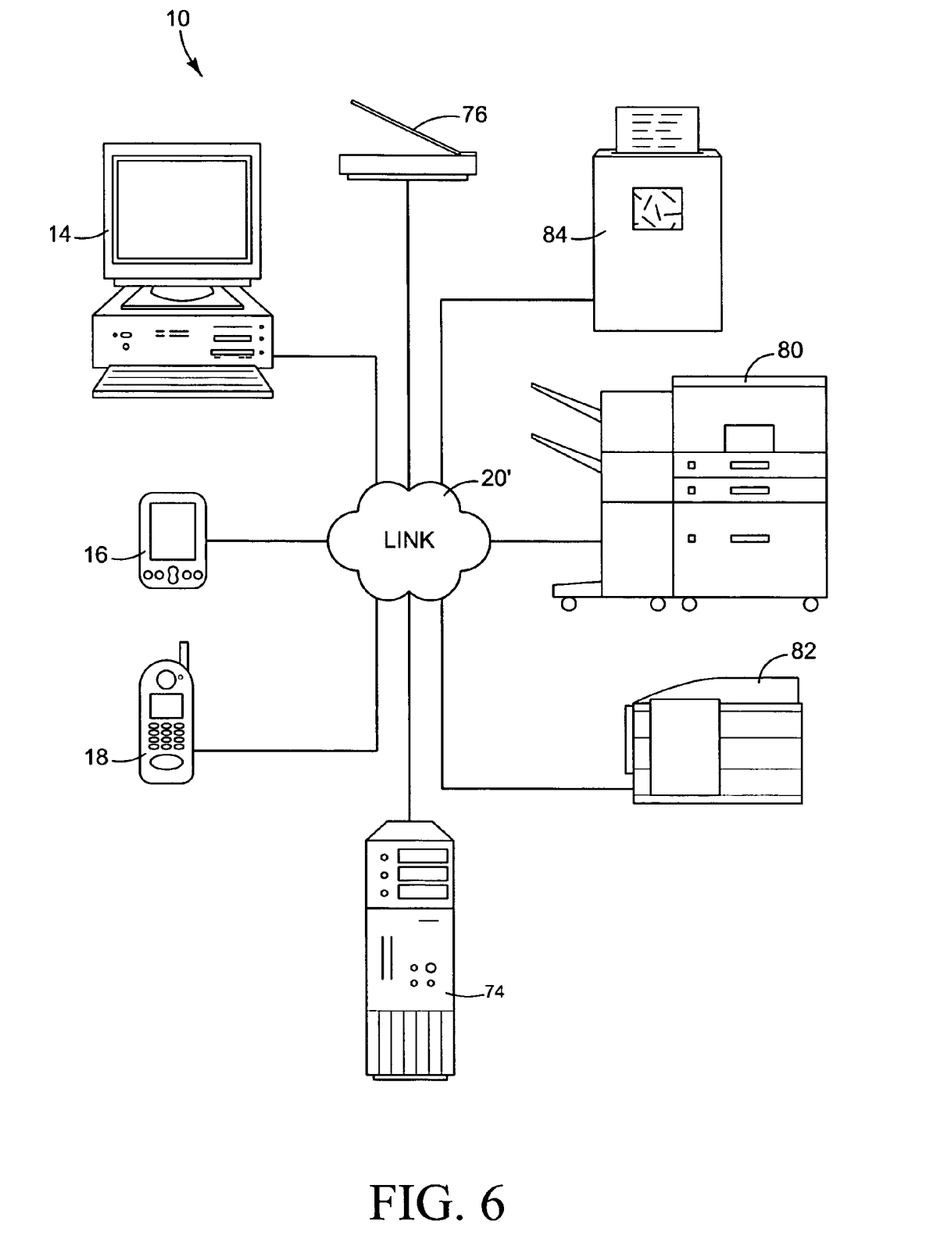
FIG. 6 is a schematic view of another exemplary network in which embodiments of the present invention may be implemented.

Moving on to FIG. 6, an alternative network 10' for implementing embodiments is shown. Here, network 10' includes client devices 14-18, but the functions of imaging device 12 of FIGS. 1-5 are separated among server device 74, scanner device 76, copier 80, printer 82, and shredder 84. Document manager 30 (FIG. 2) may be software executing on server device 74. Scanner device 76 and/or copier 80 may serve as scan engine 24 (FIG. 2). Copier 80 and printer 82 may each serve as a print engine 22. In this example, shredder 84 may also include a scanner capable of digitizing a watermark printed on a page to be destroyed and communicating that information to server device 74 so that the page can be identified and its status updated by document manager 30.

Figure 7:
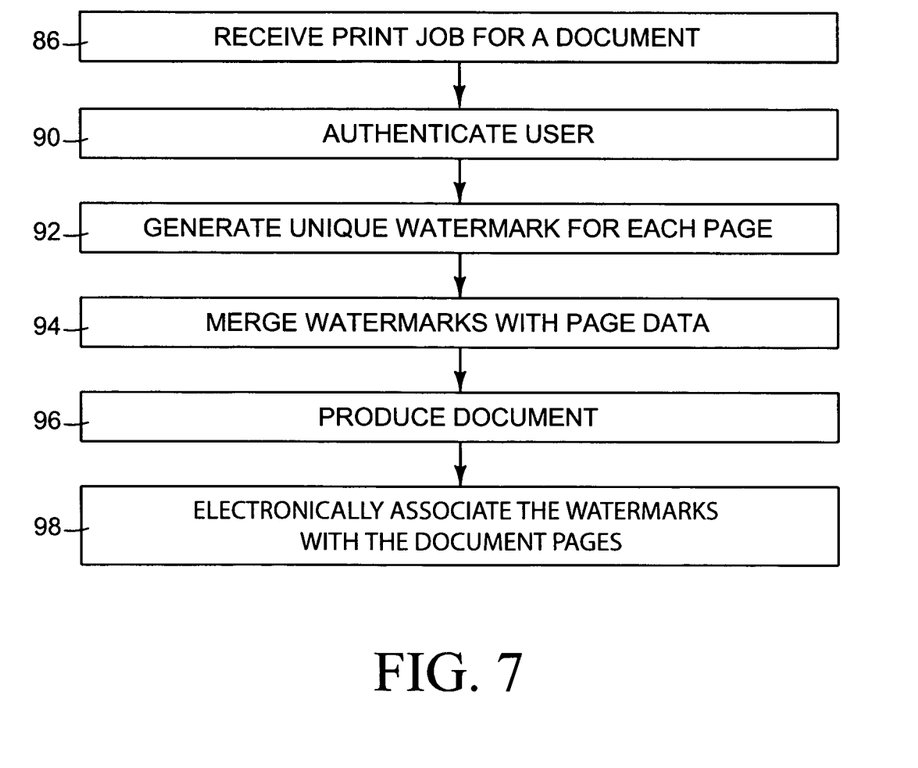
FIGS. 7 and 8 are exemplary flow diagrams illustrating steps for implementing various embodiments.

Operation:

The operation of embodiments will now be described with reference to the flow diagrams of FIGS. 7 and 8. FIG. 7 is a flow diagram of exemplary acts performed when generating an original document. FIG. 7 is a flow diagram of exemplary acts performed when operating on a printed document. Starting with FIG. 7, a print job is received for a document (step 86). A user responsible for the print job is identified or otherwise authenticated (step 90). A unique watermark is generated for each page of the print job (step 92). The watermarks are then electronically merged with or otherwise added or appended to the print job so that each page, when printed, includes a corresponding identifying watermark (step 94). A document is produced from the print job (step 96). Each watermark is then electronically associated with its corresponding document page (step 98).

Data encoded in each watermark may include a page number and document identifier. Step 96, for example, may then be performed by creating database entries each containing data encoded in or otherwise identifying a watermark. The same database entries may also be associated with data identifying the responsible user as well as data indicating the status of the page. As note above, status data may include permissions for the document page as well as an indication, in this case, that the document page is an original and not a copy.

A method implementing an embodiment need not include each act listed in FIG. 7. For example, an exemplary method may include generating and merging a unique watermark for and with each page of a print job to be produced and then, for each watermark, associating data identifying the watermark with data identifying a document page corresponding to the print job page with which that watermark is merged.

In the example of FIGS. 1 and 2, imaging device 12 is responsible for receiving the print job in step 86. The print job may be for an original document received from one of client devices 14-18, or the print job may be for a copy to be produced from pages digitized by scan engine 24. User authenticator 32 identifies the user in step 90. Watermark generator 34 generates and merges a watermark for and with each page of the print job in steps 92 and 94. Print engine 22 processes the print job to produce a printed document in step 96 so that each printed page includes a corresponding identifying watermark. Data manager 38 adds, for each watermark, an entry to data store containing data encoded in or otherwise identifying that watermark in step 98.

In the example of FIG. 6, server device 74 receives the print job from one of client devices 14-18 in step 86. Document manager 30 (seen in FIG. 2) operating on server device 74 performs steps 90, 92, 94, and 98 while server device sends the print job on to one of copier 80 or printer 82 to be produced.

Figure 8:
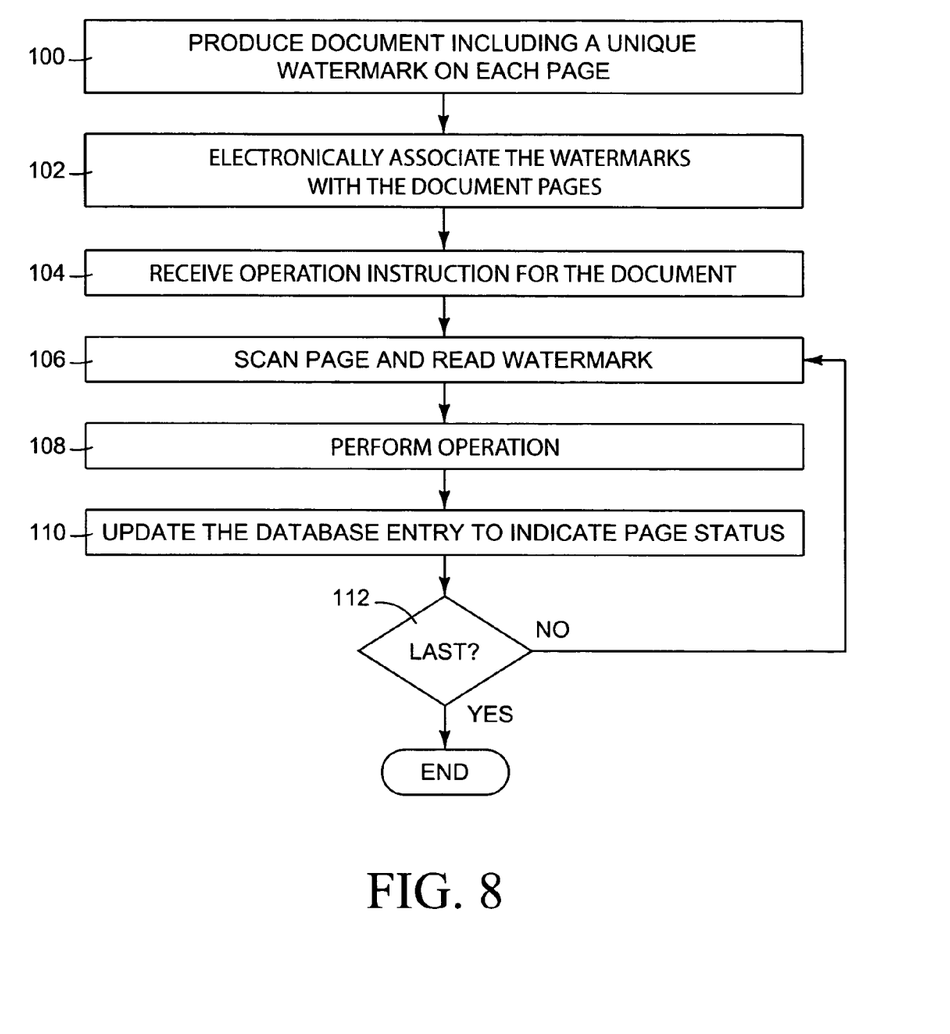

Moving on to the flow diagram of FIG. 8, a document is produced to include a unique identifying watermark on each page (step 100). Each watermark is then electronically associated with its corresponding document page (step 102). Data encoded in each watermark may include a page number and document identifier. Step 102, for example, may be performed by creating database entries each containing data encoded in or otherwise identifying a watermark. The same database entries may also be associated with data identifying the responsible user as well as data indicating the status of the page. As noted above, status data may include permissions for the document page as well as an indication that the document page is an original or a copy.

Instructions for performing an operation on at least one page of the document are then received (step 104). Examples of operations include but are not limited to shredding, copying, faxing, transmitting via electronic mail or other electronic means, and scanning to a file. A page or portion thereof is scanned to recognize its watermark (step 106). Step 106 may be accomplished by locating and decoding the watermark. For example, where a watermark is a barcode with a known placement, only the barcode need be scanned to decode its contents. Where the watermark is more fully integrated into the contents of a page, the entire page may be digitized to recognize the watermark and to decode its contents.

The instructed operation is performed with respect to that page (step 108). A data base entry corresponding to the watermark is updated to indicate the status of the page (step 110). Depending on the operation performed, the database entry is updated to reflect that the page has been copied, shredded, faxed to a particular recipient, digitally transmitted in an electronic mail message, or scanned to a particular file. It is then determined if the page is the last page for which the operation is to be performed (step 112). If it is not, the process skips back to step 106 otherwise the process ends.

In the example of FIGS. 1-5, document manager 30 and print engine 22 are responsible for steps 100 and 102. More specifically, watermark generator 34 generates and merges a watermark for and with each page of the print job. Print engine 22 processes the print job to produce a printed document so that each printed page includes a corresponding watermark. Data manager 38 adds, for each watermark, an entry to data store 40 containing data encoded in or otherwise identifying that watermark.

Imaging device 12 or 12' receives the instructions for performing an operation on the document in step 104. In the case of imaging device 12, that operation may include copying. With imaging device 12', that operation may be copying or shredding. In step 106, scan engine 24 scans the page while watermark reader 36 recognizes the watermark. Imaging device 12 or 12' perform the instructed operation in step 108. Data manager 38 completes the process performing step 110 updating an entry in data store 42.

In the Example of FIG. 6, server device 74 and one of copier 80 or printer 82 is responsible for steps 100 and 102. More specifically, watermark generator 34 of document manager 30 operating on server device 74 generates and merges a watermark for and with each page of the print job. Copier 80 or printer 82 processes the print job to produce a printed document so that each printed page includes a corresponding identifying watermark. Data manager 38 operating on server device 74 adds, for each watermark, an entry to data store 40 containing data encoded in or otherwise identifying that watermark.

Scanner 76, shredder 84, or copier 80 receives the instructions for performing an operation on the document in step 104. In the case of scanner 76, that operation may include scanning to a file, faxing, or transmitting via electronic mail. With respect to shredder 84, that operation is shredding. With respect to copier 80, that operation is copying. In step 106, a scanner operating on scanning device 76, shredder 84, or copier 82 scans the page while watermark reader 36 operating on server device 74 recognizes the watermark. Scanner, 76, shredder 84, or copier 80 performs the instructed operation in step 108. Data manager 38 operating on server device 74 completes the process performing step 110 updating an entry in data store 42.

CONCLUSION

The schematic diagrams of FIGS. 1 and 6 illustrate exemplary networks in which embodiments may be implemented. Implementation, however, is not limited to the networks shown. The block diagrams of FIGS. 2-5 show the architecture, functionality, and operation of various embodiments of the present invention. A number of the blocks are defined at least in part as programs. Each of those blocks may represent in whole or in part a module, segment, or portion of code that comprises one or more executable instructions to implement the specified logical function(s). Each block may also represent a circuit or a number of interconnected circuits to implement the specified logical function(s).

Also, the present invention can be embodied at least in part, in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes, hard drives or a portable compact disc.

Although the flow diagrams of FIGS. 7 and 8 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A document management method comprising:
for each page of a print job to be produced, generating and merging a watermark with that page, wherein the watermark merged with each given page of the print job is unique with respect to all other watermarks merged with all other pages of the print job; and
for each watermark merged with a page of the print job, associating, in a database, data identifying that watermark with data identifying the particular page of the print job with which that watermark is merged,
wherein the data identifying the watermark maintained within the database does not include data encoded within the watermark itself.

2. The method of claim 1, further comprising identifying a user responsible for a document produced from the print job and associating data identifying the user with the data identifying the watermarks generated for the print job.

3. The method of claim 1, further comprising processing the print job to produce the document, the document having a plurality of document pages, each document page including the particular watermark merged with the print job page for that document page.

4. The method of claim 3, further comprising maintaining status data for each document page, the status data for each document page being associated with the data identifying that document page's corresponding watermark.

5. The method of claim 4, wherein the status data associated with a given document page at least indirectly indicates whether or not that document page has been destroyed, copied or otherwise acted upon.

6. The method of claim 4, wherein maintaining comprises updating the status data for a given document page upon a determination that an operation has been or will be performed with respect to the document page.

7. The method of claim 1, further comprising:
processing the print job to produce the document, each document page including the watermark merged with the print job page for that document page;
recognizing the watermark included on a selected document page; identifying an operation performed on the selected document page; and associating status data with the data identifying the watermark included on the selected document page, the status data identifying the operation that has been performed on the selected document page.

8. The method of claim 7, wherein identifying an operation comprises identifying that the selected document page has been or will be destroyed, copied, or otherwise acted upon.

9. The method of claim 7, wherein identifying an operation comprises identifying that the selected document page has been or will be copied.

10. A document management method, comprising:
maintaining, for a document, a database containing, for each document page of the document, data identifying that document page associated with data identifying a watermark included on that document page, the watermark being unique with respect to all other watermarks included on all other document pages of the document;
recognizing the watermark included on a selected document page of the document; performing an operation on the selected document page; and
associating, in the database, status data with the data identifying the watermark included on the selected document page, the status data identifying the operation that has been performed on the selected document page,
wherein the data identifying the watermark maintained within the database does not include data encoded within the watermark itself.

11. The method of claim 10, further comprising repeating the acts of recognizing, performing, and associating for each page in the document.

12. The method of claim 10, wherein performing an operation comprises producing a copy of the selected document page, wherein recognizing includes digitizing the selected document page, the method further comprising:

generating and merging a new watermark with the digitized document page;

associating, in the database, data identifying the new watermark with data identifying the copy of the selected document page; and wherein producing a copy comprises processing the digitized document page merged with the new watermark to produce the copy of the selected document page.

13. The method of claim 12, further comprising removing the recognized watermark from the digitized document page.

14. The method of claim 12, wherein generating comprises modifying the recognized watermark to generate the new watermark.

15. A non-transitory computer readable medium having computer executable instructions for each page of a print job to be produced, generating and merging a watermark with that page, wherein the watermark merged with each given page of the print job is unique with respect to all other watermarks merged with all other pages of the print job; and for each watermark merged with a page of the print job, associating, in a database, data identifying that watermark with data identifying the particular page of the print job with which that watermark is merged, wherein the data identifying the watermark maintained within the database does not include data encoded within the watermark itself.

16. The non-transitory computer readable medium of claim 15, having further instructions for identifying a user responsible for a document produced from the print job and associating data identifying the user with the data identifying the watermarks generated for the print job.

17. The non-transitory computer readable medium of claim 15, having further instructions for processing the print job to produce the document having a plurality of document pages, each document page including the particular watermark merged with the print job page for that document page.

18. The non-transitory computer readable medium of claim 17, having further instructions for maintaining status data for each document page, the status data identifying an operation that has been performed on the document page.

19. The non-transitory computer readable medium of claim 18, wherein the status data associated with a given document page at least indirectly indicates whether or not that document page has been or will be destroyed, copied, or otherwise acted upon.

20. The non-transitory computer readable medium of claim 18, wherein the instructions for maintaining include instructions for updating the status data for a given document page upon a determination that an operation has been or will be performed with respect to the document page.

21. The non-transitory computer readable medium of claim 15, having further instructions for processing the print job to produce the document, each document page including the watermark merged with the print job page for that document page;

recognizing the watermark included on a selected document page; identifying an operation performed on the selected page; and associating status data with the data identifying the watermark included on the selected document page, the status data identifying the operation.

22. The non-transitory computer readable medium of claim 21, wherein the instructions for identifying an operation performed include instructions for identifying that the selected document page has been or will be destroyed, copied, or otherwise acted upon.

23. The non-transitory computer readable medium of claim 21, wherein the instructions for identifying an operation performed include instructions for identifying that the selected document page has been or will be copied.

24. A document management system, comprising:

a watermark generator operable, for each page of a print job to be produced, to generate and merge a unique watermark with that page, wherein the watermark merged with each given page of the print job is unique with respect to all other watermarks merged with all other pages of the print job; and a data manager operable, for each watermark merged with a page of the print job, to associate, in a database, data identifying that watermark with data identifying the particular page of the print job with which that watermark is merged, wherein the data identifying the watermark maintained within the database does not include data encoded within the watermark itself.

25. The system of claim 24, further comprising a user authenticator operable to identify a user responsible for the a document produced from the print job and wherein the data manager is operable to associate data identifying the user with the data identifying the watermarks generated for the print job.

26. The system of claim 24, wherein the data manager is operable to maintain status data for each document page, the status data for each document page being associated with the data identifying that document page's corresponding watermark, the status data identifying an operation that has been performed on the document page.

27. The system of claim 26, wherein the status data associated with a given document page at least indirectly indicates whether or not that that document page has been or will be destroyed, copied, or otherwise acted upon.

28. The system of claim 26, wherein the data manager is operable to update the status data for a given document page upon a determination that an operation has been or will be performed with respect to the document page.

29. The system of claim 24, further comprising:

a scan engine operable to digitize at least a portion of a selected document page;

a watermark reader operable to recognize the watermark included on that document page;

and wherein the data manager is operable to associate status data with the data identifying the watermark included on the selected document page, the status data identifying an operation that has been or will be performed on the selected document page.

30. A document management system, comprising:

means for generating and merging, for each page of a print job to be produced, a watermark with that page, wherein the watermark merged with each given page of the print job is unique with respect to all other watermarks merged with all other pages of the print job; and means for associating in a database, for each watermark merged with a page of the print job, data identifying that watermark with data identifying the particular page of the print job with which that watermark is merged, wherein the data identifying the watermark maintained within the database does not include data encoded within the watermark itself.

* * * * *